(12) United States Patent
Ueda

(10) Patent No.: US 6,283,395 B1
(45) Date of Patent: *Sep. 4, 2001

(54) CASSETTE ADAPTER AND MAGNETIC RECORDING/REPRODUCING APPARATUS

(75) Inventor: Mikiya Ueda, Kobe (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,760

(22) Filed: Mar. 17, 1999

Related U.S. Application Data

(62) Division of application No. 08/836,639, filed on Aug. 4, 1997, now Pat. No. 5,934,591.

(30) Foreign Application Priority Data

| | | |
|---|---|---|
| Sep. 28, 1995 | (JP) | 7-250674 |
| Oct. 6, 1995 | (JP) | 7-259760 |
| Sep. 26, 1996 | (WO) | PCT/JP96/02788 |

(51) Int. Cl.[7] .................................................. G11B 23/04
(52) U.S. Cl. ............................................. 242/336; 360/94
(58) Field of Search ................................ 242/336, 338.1, 242/338.3, 343; 360/94, 132

(56) References Cited

U.S. PATENT DOCUMENTS

| | | | |
|---|---|---|---|
| 3,610,552 | | 10/1971 | Shirakura et al. ................... 242/199 |
| 4,559,574 | * | 12/1985 | Umeda ................................. 242/336 |
| 4,622,605 | * | 11/1986 | Tsuruoka et al. .................... 242/336 |
| 5,034,832 | | 7/1991 | Sato et al. .............................. 360/94 |
| 5,173,818 | | 12/1992 | Chan ...................................... 360/94 |
| 5,365,393 | | 11/1994 | Weber et al. ......................... 360/132 |
| 5,402,954 | | 4/1995 | Skavnak et al. ..................... 242/336 |
| 5,934,591 | * | 8/1999 | Ueda .................................... 242/336 |

FOREIGN PATENT DOCUMENTS

| | | |
|---|---|---|
| 0 367 454 | 5/1990 | (EP) . |
| 0 533 181 | 3/1993 | (EP) . |
| 60-40545 | 3/1985 | (JP) . |
| 5-250840 | 9/1993 | (JP) . |

\* cited by examiner

*Primary Examiner*—John Q. Nguyen
(74) *Attorney, Agent, or Firm*—McDermott, Will & Emery

(57) ABSTRACT

A casette adapter in which an S-casette (first casette) of the professional digital video format is housed and having a shape identical with an different-sized M-casette (second casette) operate without fail under a simple constitution, without accompanying any fear of damage on a tape. The cassette adapter capable of housing an S-cassette (2) comprises an adapter (1) whose shape is identical to an different-sized M-cassette. Reels (5, 6) and a reel brake releasing member (7) of the S-cassette (2) are exposed while the S-cassette is mounted in the cassette adapter. The adaptor (1) includes a rear door (12) capable of opening and closing. The rear door (12) comprises contacts (14) for reading identification signal by contacting the identification terminal of S-casette, wirings (16) for coupling the contacts (14) with an identification terminal (15) provided in a same location as that of M-cassette and a lever (18) for opening/closing an anti-erasing window in linkage with the anti-erasing gear of S-cassette (2).

4 Claims, 5 Drawing Sheets

CASSETTE ADAPTER AND MAGNETIC RECORDING/REPRODUCING APPARATUS

This is a divisional of application Ser. No. 08/836,639, filed Aug. 4, 1997, U.S. Pat. No. 5,934,591

TECHNICAL FIELD

The present invention relates to a cassette adapter for the S-cassette (first cassette) of professional digital video format, which cassette adapter being formed in a same shape as the M-cassette (second cassette) the size of which is different from the S-cassette, as well as a magnetic recording/reproducing apparatus on which the cassette adapter is to be loaded.

BACKGROUND ART

There has been a VHS cassette adapter as shown in FIG. 6, where a C-cassette 25 is inserted in an adapter 26 which has a same size as that of a full-size VHS cassette playable on a magnetic recording/reproducing apparatus.

In the adapter, C-cassette 25 is mounted in adapter 26 from the top surface with a tape protection lid 27 of the C-cassette open, and a protection cover in the top surface of adapter 26 is closed for operation. A reel brake (not shown) of C-cassette 25 is released when a C-cassette is mounted in the adapter 26 by a lock releasing pin (not shown) provided on adaptor 26.

After the protection cover of adapter 26 is closed, tape 28 is pulled out of C-cassette 25 by a pulling post 29 to be placed to a same position as that of the full-size cassette in preparation for loading in a magnetic recording/reproducing apparatus.

As the adapter 26 incorporating a C-cassette 25 assumes an exactly the same shape and function as a full-size VHS cassette, no extra switching gear needs to be provided in a magnetic recording/ reproducing apparatus for recording and reproducing with the adapter.

In the professional digital video format, there are two cassette forms; an S-cassette (S signifies small; a first cassette in the present invention) and an M-cassette of different size (M signifies middle; a second cassette in the present invention). If the same structure as in the VHS format is introduced for the professional digital video version, problems arise. Namely, as the space between the reels is small in the S-cassette and the M-cassette, the coupling of reel movement will become very complicated when forming a cassette adapter (for adapting an S-cassette for the M-cassette shape) with the reel placed in the same position as that of the M-cassette. Furthermore, if reel brake is released when an S-cassette is mounted in an adapter the reel is left unlocked and tape becomes loose inviting a damage.

Difference in the level of top surface between S-cassette and M-cassette is 1mm. Therefore it is difficult to provide a protection cover on the top surface of an adapter for covering S-cassette; which means that an S-cassette can not be mounted in from the top surface, and it becomes very difficult to couple the identification terminal and the anti-erasing gear of an S-cassette with the counterparts of the adapter which are disposed in the places corresponding to those of the M-cassette.

Furthermore, because both the cassette adapter and the M-cassette assume an identical shape it is impossible for a magnetic recording/ reproducing apparatus to judge whether the one being loaded is a cassette adapter or an M-cassette.

Therefore, in a case when a cassette adapter is loaded in a magnetic recording/reproducing apparatus which is incompatible with adapter, there will be a possiblity of broken equipment.

DISCLOSURE OF THE INVENTION

The present invention is intended to solve the above described problems with a simple structure, and presents as a first objective an adapter for the S-cassette of professional digital video format, the shape of adapter being the same as the M-cassette, whose constitution is simple yet assures a reliable operation without a fear of damage on tape etc., and as a second objective, a magnetic recording/ reproducing apparatus which is capable of identifying a cassette adapter and an M-cassette by a simple mechanism.

For implementing the above described first objective, a cassette adapter according to the present invention comprises an adapter having a same shape as an M-cassette (second cassette), the size being different from an S-cassette (first cassette), for mounting the S-cassette in. Reels and a reel brake releasing member of the S-cassette are exposed while the S-cassette is mounted in the adapter. The adapter is provided with a rear door which comprises a contact for reading identification signal by touching an identification terminal of S-cassette, a wiring member for coupling the contact with an identification terminal disposed at the same location as that of M-cassette, and a lever to open/close an anti-erasing window in linkage with the anti-erasing gear of an S-cassette mounted in the adapter.

Under the above described constitution, as the reel and the reel brake releasing member of S-cassette mounted in the adapter remain in the same location as they were as an S-cassette, there is no need of providing mechanisms for coupling respectively the reel operation and the reel brake releasing member. Thus an adapter may be formed very simple. Furthermore, as the reading of identification signal from the S-cassette and the open/close work of anti-erasing window are performed solely by the rear door, a reliable operation is ensured from the simple structure.

In order to implement the second objective, a magnetic recording/ reproducing apparatus according to the present invention comprises a shape identification means which can receive a cassette adapter of the same shape as the M-cassette incorporating an S-cassette, and at the same time identifies whether it is a cassette adapter or an M-cassette. Based on the detection by the shape identification means, the mechanical and electrical systems of the magnetic recording/reproducing apparatus are modified accordingly to accept a cassette adapter.

Under the above described constitution, both the mechanical and electrical systems of an adapter-compatible magnetic recording/reproducing apparatus are easily modified to drive a cassette adapter.

BEST MODE FOR CARRYING OUT THE INVENTION

Figure 1:
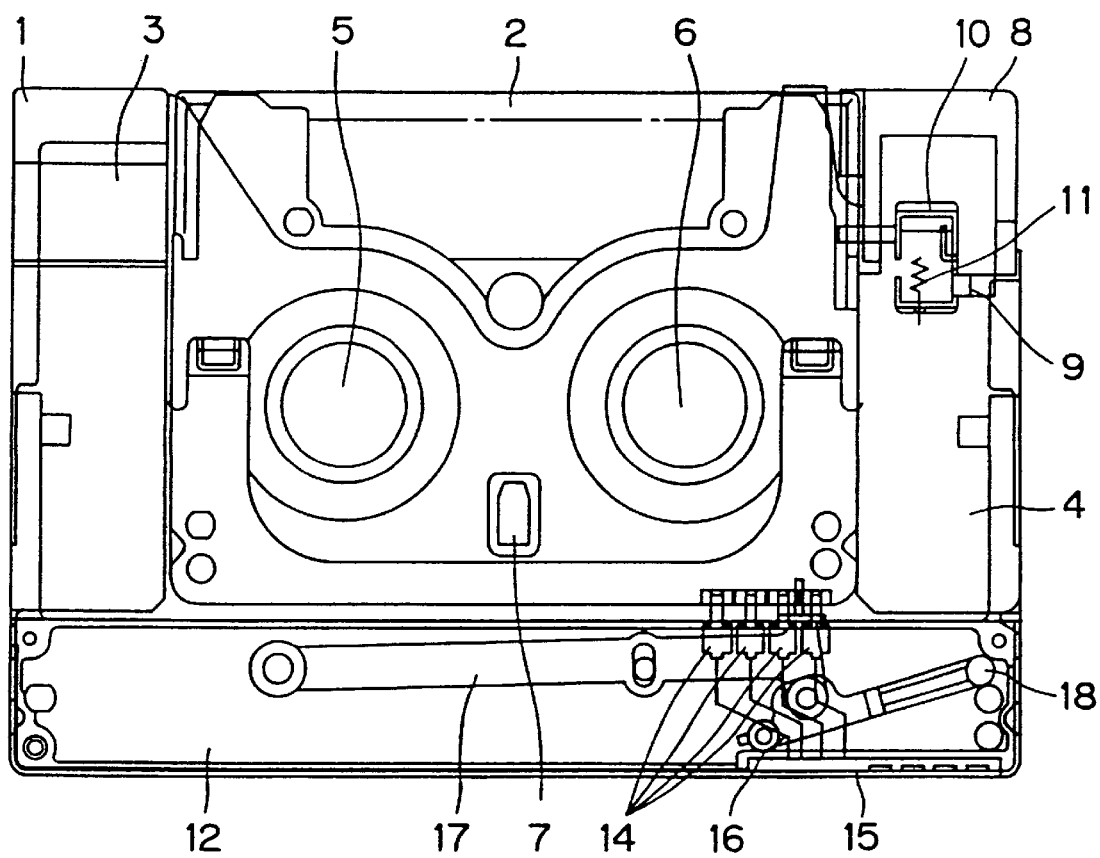
FIG. 1 is a plane view of a cassette adapter according to a first embodiment of the present invention.
Figure 2:
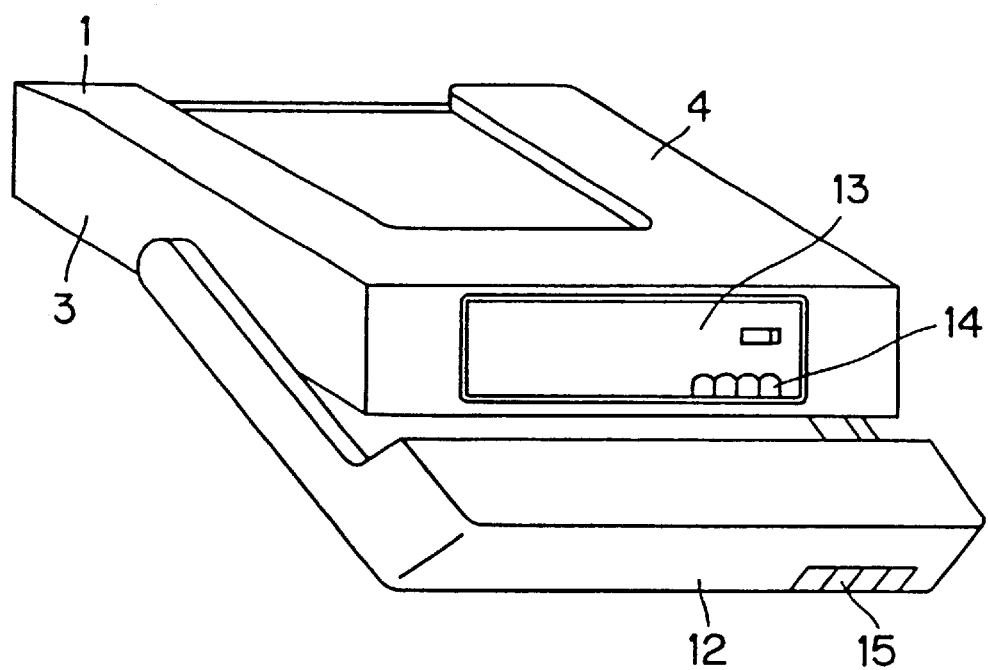
FIG. 2 is a perspective view showing the cassette adapter of FIG. 1, with the rear door open.

A first embodiment of the present invention is described in the following with reference to FIG. 1 and FIG. 2. FIG. 1 shows a plane view of a cassette adapter compatible with the professional digital video format, FIG. 2 is a detailed view of a portion for inserting an S-cassette.

As shown in FIG. 1, an adapter 1 assumes a same shape as the M-cassette (second cassette), has a right and a left cassette guides 3, 4 for guiding an S-cassette (first cassette) 2 to the centre of adapter 1. While an S-cassette 2 is being mounted in the adapter 1, reels 5, 6 and a reel brake releasing member 7 of the S-cassette 2 are exposed.

An operation coupling member 8 is for releasing the lock and opening/closing a cassette lid of S-cassette 2 by making use of a mechanism of a magnetic recording/reproducing apparatus to open/close a cassette lid of M-cassette. A lever 9 is disposed on a place corresponding to a lock releasing lever (not shown) for cassette lid of M-cassette on a magnetic recording/reproducing apparatus. A lever 10 is disposed on a place corresponding to a locking member (not shown) for cassette lid of S-cassette 2, and is provided with a spring 11 and coupled with the lever 9. Namely, the lock of cassette lid for protecting magnetic tape of S-cassette 2 is released by the levers 9, 10 and spring 11 which are coupled with a means for releasing the lock of M-cassette lid in a magnetic recording/reproducing apparatus.

A rear door 12 is for fixing an S-cassette 2 inserted through a mounting slot 13. The rear door 12 comprises contacts 14 touching to the identification terminal of S-cassette 2, identification terminal 15 for outputting an M-cassette identification signal, wiring members 16 for coupling the contacts 14 with the identification terminal 15, a moving member 17 which moves in compliance with the open/close of anti-erasing gear of S-cassette 2, and a lever 18 which opens/closes the anti-erasing window of M-cassette in compliance with the moving member 17.

With the above described constitution, the operation is described in the following. For mounting an S-cassette 2 in adapter 1, the rear door 12 of adapter 1 is lowered as shown in FIG. 2 and then an S-cassette 2 is inserted to the opened mounting slot 13. The S-cassette 2 is guided to a specified position by the cassette guides 3, 4 disposed at the right and left of adapter 1.

In the state where an S-cassette 2 is being mounted, as the reels 5, 6 and the reel brake releasing member 7 are exposed, the positioning of reels 5, 6 and reel brake releasing member 7 of the S-cassette mounted in adapter 1 remain the same as that of an S-cassette 2. Therefore, there is no need of providing a mechanism for coupling respectively the reel operation and reel brake releasing action. Thus, an adapter is constituted with a very simple structure.

Next, the rear door 12 is pushed up to fix S-cassette 2. The contacts 14 embodied in the rear door 12 for reading the identification terminal of S-cassette 2 make contact, and the moving member 17 moves in accordance with the open/close of the anti-erasing gear of S-cassette 2. As the contacts 14 are electrically coupled with identification terminal 15 of adapter 1 through wirings 16, the information in the identification terminal can be read out at the same location as that of M-cassette. The moving member 17 is coupled via a pin with lever 18 provided for opening/closing the anti-erasing window of M-cassette, and opens/closes the anti-erasing window of M-cassette in accordance with the open/close of anti-erasing gear of S-cassette 2.

In the state when an S-cassette 2 is being inserted in adapter 1, a cassette lid lock member of the S-cassette 2 is still out of functioning because the lever 10 is retained by spring 11; the lid of S-cassette 2 is kept closed protecting the tape from a possible damage, and the S-cassette is protected from intrusion of dusts.

When the adapter 1 is loaded in a magnetic recording/reproducing apparatus, the lever 9 is driven by a lock releasing lever of the magnetic recording/reproducing apparatus provided for unlocking cassette lid of an M-cassette, and the lever 10 coupled with lever 9 is revolved to unlock the cassette lid lock member of S-cassette 2.

Figure 3:
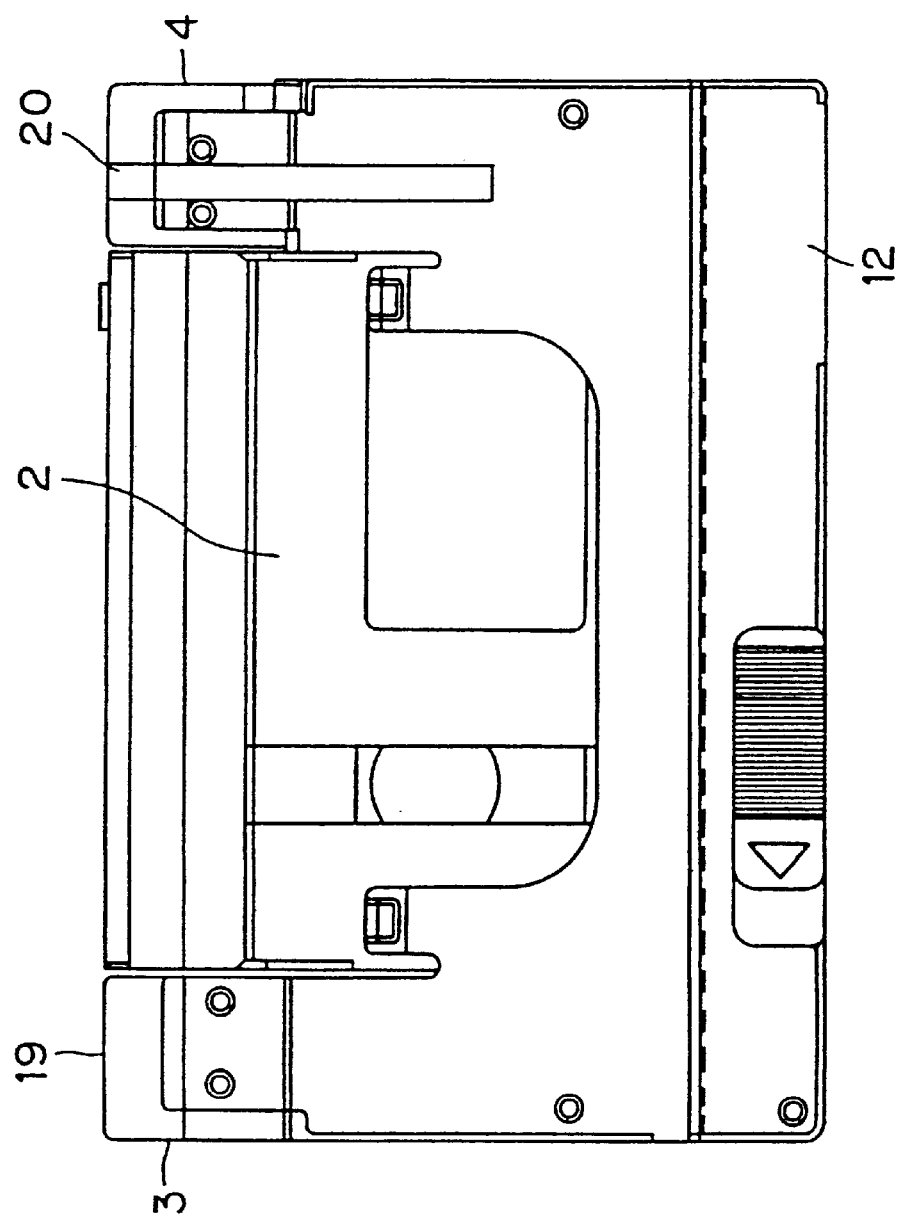
FIG. 3 (a) is a plane view of a cassette adapter according to a second embodiment of the present invention, and FIG. 3 (b) is the side view.

Now in the following, a second embodiment according to the present invention is described referring to FIGS. 3 through 5. FIG. 3 illustrates a cassette adapter which conforms with the professional digital video format, FIG. 4 shows the vicinity of a cassette loading mechanism of a magnetic recording/reproducing apparatus compatible with the cassette adapter, and FIG. 5 shows the vicinity of a cassette loading mechanism of a magnetic recording/reproducing apparatus incompatible with the cassette adapter.

As shown in FIG. 3, an adapter 19 assumes the shape of M-cassette and is provided with cassette guides 3, 4 at the right and left of the adapter for guiding an S-cassette 2 to the centre of adapter 19 and a groove 20 in the top surface for distinguishing the adapter from M-cassette. The rest portion of the adapter 19 remains the same as those of said first embodiment. In place of the groove 20, a hollow (not shown) may serve the same purpose.

Figure 4:
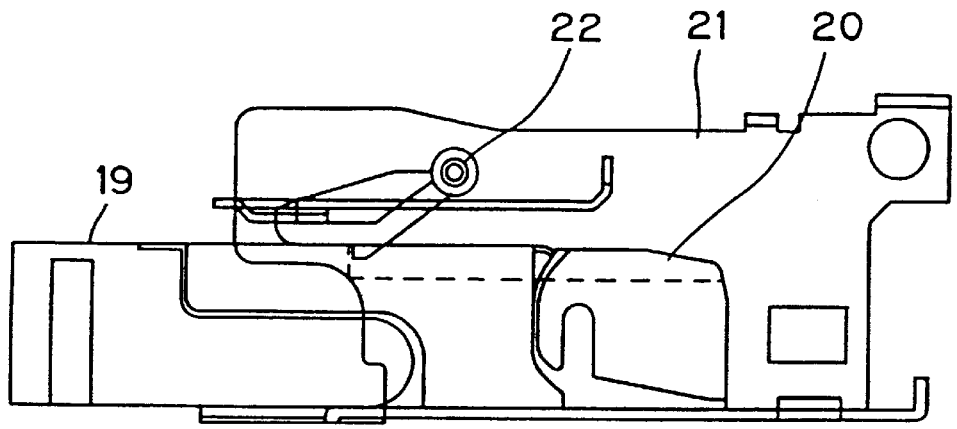
FIG. 4 is a side view showing a cassette holder of a cassette adapter compatible magnetic recording/reproducing apparatus.

A magnetic recording/reproducing apparatus compatible with the adapter 19 comprises a cassette holder 21 for accepting a cassette or an adapter 19, as shown in FIG. 4. A shutter 22 identifies whether it is an adapter 19 or not. When an adapter 19 is loaded in a magnetic recording/reproducing apparatus, the magnetic recording/reproducing apparatus modifies the mechanical and the electrical systems; viz. the reel positioning, the cassette reel brake releasing position, the tape tensioning and the signal processing are modified to be suitable to the loading of adapter 19.

Figure 5:
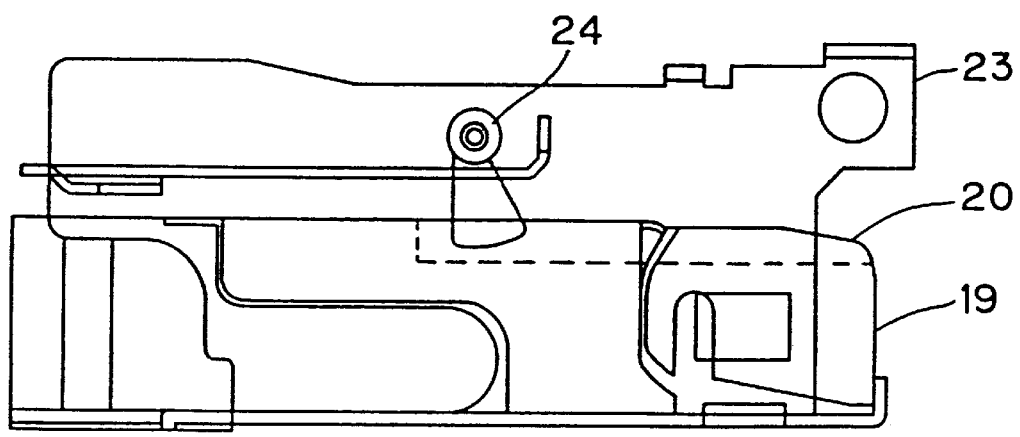
FIG. 5 is a side view showing a cassette holder of a magnetic recording/reproducing apparatus incompatible with cassette adapter.
Figure 6:
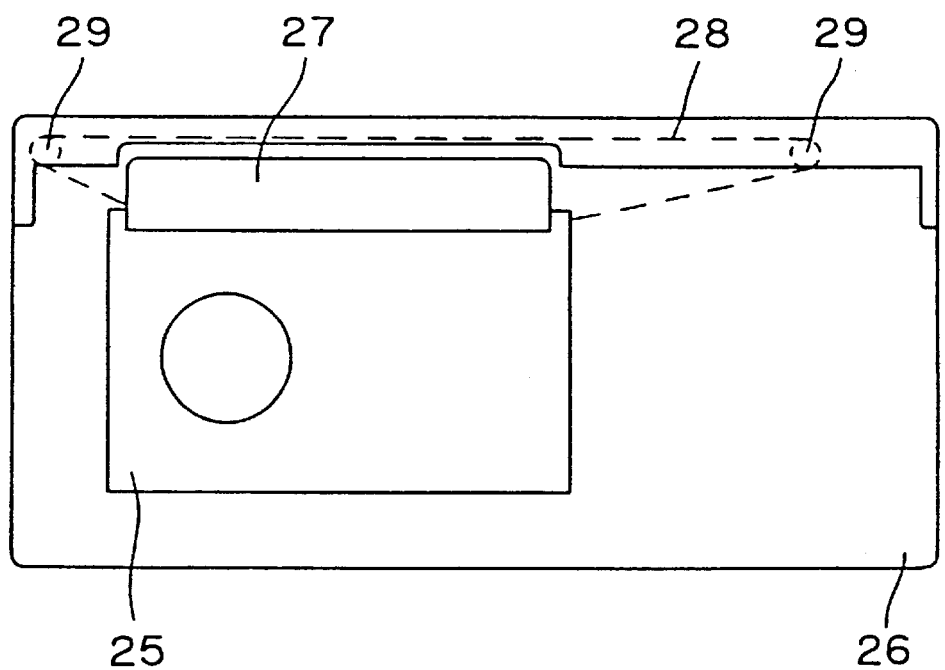
FIG. 6 is a plane view of an adapter for the VHS C-cassette.

A magnetic recording/reproducing apparatus incompatible with the adapter 19 comprises a cassette holder 23 for receiving a cassette or an adapter 19, as shown in FIG. 5. In the case when an adapter 19 is inserted, a stopper 24 blocks loading of the adapter 19.

Now in the following, description will be made on how the above mentioned structure operates. When an adapter 19 is inserted to the cassette holder 21 of a magnetic recording/reproducing apparatus compatible with adapter 19, the shutter 22 moves in compliance with groove 20 provided in the top surface of adapter 19 to identify that it is an adapter 19, as shown in FIG. 4, and the arrangement of mechanical and electrical systems in the magnetic recording/reproducing apparatus are modified accordingly.

When an adapter 19 is inserted to cassette holder 23 of a magnetic recording/reproducing apparatus incompatible with adapter 19, the stopper 24 touches groove 20 provided in the top surface of adapter 19 as shown in FIG. 5, and blocks further insertion of the adapter 19.

INDUSTRIAL APPLICABILITY

A cassette adapter according to the present invention comprises an adapter having a same shape as a second cassette, the size being different from the first cassette, for mounting a first cassette in; wherein the reel and the reel brake releasing member of the first cassette are exposed while the first cassette is being mounted in the adapter. When an adapter incorporating an S-cassette is used, the reel and the reel brake releasing member of an S-cassette mounted in the adapter remain in the same location as they were as an S-cassette. Therefore, there is no need of providing mechanisms for coupling respectively the reel operation and the reel brake releasing member. Thus an adapter may be constituted very simple.

The adapter is provided with a rear door, which door comprises a contact for reading identification signal by touching the identification terminal of S-cassette, a means for coupling the contact with an identification terminal disposed at a same location as that of an M-cassette and a means to open/close the anti-erasing window in linkage with the anti-erasing gear of an S-cassette mounted in the adapter. As the reading of identification signal of S-cassette and the open/ close work of anti-erasing window are performed solely by the rear door, a high reliability is ensured with respect to these actions because of the simple structure.

Thanks to a means for releasing the lock on a cassette lid provided to protect magnetic tape of the first cassette which works in compliance with a lid unlocking mechanism of magnetic recording/reproducing apparatus, the cassette lid of S-cassette is kept closed by its own lock mechanism even after it is inserted in the adapter, and the tape is protected from a possible damage and intrusion of dusts into the S-cassette is prevented.

By making the shape of a part of adapter different from that of the M-cassette, an adapter whose shape is identical to the M-cassette is easily distinguished from the M-cassette. By providing a groove or a hollow in a part of adapter, an adapter whose shape is identical to the M-cassette is easily distinguished from the M-cassette.

In a magnetic recording/reproducing apparatus according to the present invention which receives a cassette adapter of a same shape as the M-cassette incorporating an S-cassette of a different size and comprises a shape identification means for distinguishing the cassette adapter from the M-cassette, the mechanical and the electrical systems are modified based on detection result obtained from the shape identification means to be suitable to operate the cassette adapter. Therefore the cassette adapter is identified without fail when a cassette adapter is inserted in a cassette adapter-compatible magnetic recording /reproducing apparatus, and the mechanical and the electrical systems are modified to be suitable to loading of cassette adapter.

Based on detection result obtained from the shape identification means of magnetic recording/reproducing apparatus, the reel positioning, the cassette reel brake releasing position, the tape tensioning and the signal processing of the magnetic recording/reproducing apparatus are modified to be suitable for a cassette adapter. Therefore, when a cassette adapter is inserted, the mechanical and the electrical systems are easily modified to accept the loading of cassette adapter.

In a magnetic recording/reproducing apparatus according to the present invention which receives a cassette adapter of a same shape as the M-cassette incorporating an S-cassette of a different size and comprises a shape identification means for distinguishing the cassette adapter from the M-cassette, the further insertion of a cassette adapter to the magnetic recording/reproducing apparatus is blocked based on detection result obtained from said shape identification means. Therefore, an errorneous insertion of a cassette adapter to a cassette-incompatible magnetic recording/reproducing apparatus is readily prevented.

What is claimed is:

1. A cassette adapter for use in a magnetic recording/reproducing apparatus in which a first cassette is mountable, comprising an adapter having a same shape as a second cassette of a different size from the first cassette; said first cassette comprising a first reel, a second reel and a reel brake releasing member, wherein the first reel, the second reel and the reel brake releasing member of the first cassette are exposed to the outside of said adapter while the first cassette is mounted in the cassette adapter, wherein said first reel is exposed to the outside of the adapter through a first opening in said first cassette, said second reel is exposed to the outside of the adapter through a second opening in said first cassette, and said reel brake releasing member is exposed to the outside of the adapter through a third opening in said first cassette, wherein said third opening is distinct and isolated from said first and second openings.

2. A cassette adapter of claim 1, wherein the shape of a part of the adapter is made to be different from that of the second cassette so that the cassette adapter is distinguishable from the second cassette.

3. A cassette adapter of claim 2 wherein said part of the adapter is provided with a groove or a hollow to be distinguishable from the second cassette.

4. The cassette adapter recited in claim 1, wherein said reel brake releasing member is positioned between said first and second reel.

* * * * *